United States Patent [19]

Rosato et al.

[11] 4,388,366
[45] Jun. 14, 1983

[54] INSULATION BOARD

[76] Inventors: Dennis W. Rosato, 256 Fieldboro Dr., Lawrenceville, N.J. 08648; Neil K. Lister, 150 Elm Ave., Rahway, N.J. 07065

[21] Appl. No.: 390,249

[22] Filed: Jun. 21, 1982

[51] Int. Cl.³ .................. B32B 17/10; B32B 5/18; B32B 5/32

[52] U.S. Cl. .................. 428/285; 52/309.6; 428/288; 428/311.5; 428/312.6; 428/316.6; 428/332; 428/401; 428/429

[58] Field of Search ............ 428/285, 284, 288, 311.5, 428/312.6, 316.6, 429, 332, 401; 52/309.6

[56] References Cited

U.S. PATENT DOCUMENTS

| | | | |
|---|---|---|---|
| 3,483,664 | 12/1969 | Funk et al. | 52/309.6 |
| 3,579,540 | 5/1971 | Ohlhausen | 428/429 |
| 3,756,895 | 9/1973 | Bellamy | 428/311.5 |
| 3,773,603 | 11/1973 | Scholander | 428/311.5 |
| 4,073,997 | 2/1978 | Richards et al. | 428/285 |
| 4,265,962 | 5/1981 | May | 428/284 |
| 4,279,958 | 7/1981 | Ahmad | 428/285 |
| 4,283,457 | 8/1981 | Kolsky et al. | 428/311.5 |

Primary Examiner—William J. Van Balen
Attorney, Agent, or Firm—Arthur A. Jacobs

[57] ABSTRACT

An insulation board comprising a plastic foam layer which is covered by at least one facing sheet, the facing sheet comprising glass fibers bonded to each other by a bonding agent, the fibers and bonding agent being coated with a non-wicking agent, whereby although the fibrous facing sheet is porous to permit venting of gases and vapors, it is substantially liquid-repellant to prevent bleed through by various types of liquids.

6 Claims, 2 Drawing Figures

U.S. Patent   Jun. 14, 1983   4,388,366
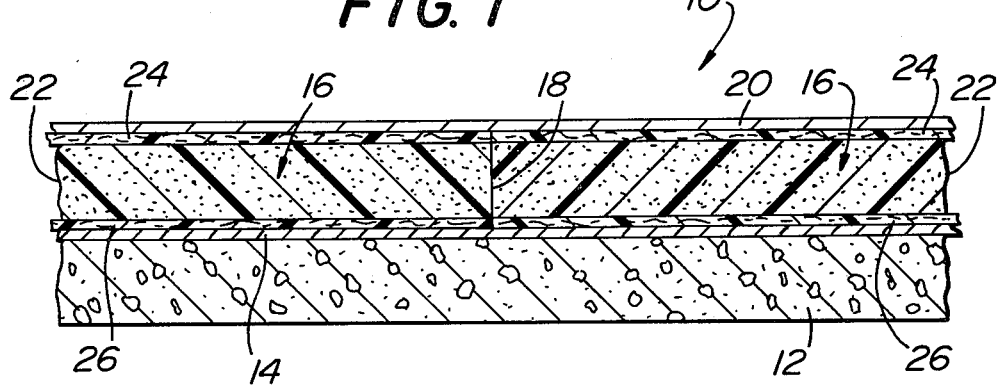
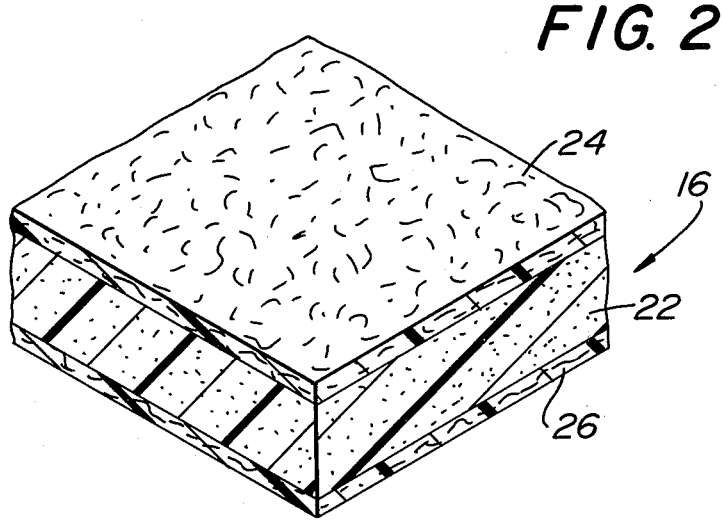

INSULATION BOARD

STATEMENT OF PRIOR ART

Representative of the prior art are the following: U.S. Pat. No. 3,029,127—Apr. 10, 1962 U.S. Pat. No. 3,174,887—Mar. 23, 1965 U.S. Pat. No. 3,211,597—Oct. 12, 1965 U.S. Pat. No. 3,215,581—Nov. 2, 1965 U.S. Pat. No. 3,302,362—Feb. 7, 1967 U.S. Pat. No. 3,466,222—Sept. 9, 1969 U.S. Pat. No. 3,510,391—May 5, 1970 U.S. Pat. No. 3,785,913—Jan. 15, 1974 *Journal Of Cellular Plastics*, Vol. 1, No. 3 July, 1965, pp. 360-361 *CPR Urethane Insulation*, "U-Thane 200 Board Stock", Upjohn, A.I.A. File 38B-1 *Urethane Foam*, Dupont, Mar.29, 1961 *Craneglass* 230, Product Bulletin, Crane & Company, Inc., 1979

This invention relates to insulation panels or boards, and it particularly relates to insulation boards that are most satisfactorily utilized in roofing.

Roof construction generally comprises a roof deck which may be made of various materials such as wood, concrete, gypsum, steel, and the like, an insulation barrier above the deck and a roof covering which usually comprises at least one layer of asphalt topped by a felt layer that is topped by another layer of asphalt. Generally about three such successive layers are used. Sometimes a layer of gravel or the like is superimposed on the top layer of asphalt.

The insulation barrier itself, may comprise one or more layers of insulating sheets placed on top of each other at the building site or it may comprise a prefabricated laminated board. The laminated type of insulation board generally comprises a plastic foam layer or core, which may be polyurethane, polyisocyanate, or the like, and has, at least on one side, a protective or facing layer that may be either rigid or flexible and is usually fire or flame- regardant. When there are two such protective layers, one on each side of the foam layer, it is generally referred to as a "sandwich" construction.

Plastic foams are used as core material in sandwich panels because of low heat transmission, rigidity, light weight, moisture-proofness and chemical inertness. Facing materials commonly used include expanded perlite boards, metal foils, organic felt, plywood, hardboard, cement- asbestos board, reinforced plastic, tempered glass and glass fiber board. Since the foam core is isolated from small ignition sources by the facing material, ignition resistance depends primarily upon the degree of protection afforded by the facing.

The bottom facers should also be capable of retarding ingress of fluids because this type of insulation board is usually made by placing the bottom facing sheets on a slatted conveyor belt and applying an even distribution of liquid foam material on the facing sheets; the foam thereafter expands and solidifies during movement of the conveyor. If the facing sheets were to permit bleeding through of the liquid foam material, this material would stick and harden on the conveyor slats, thereby making the conveyor inoperative until cleaned. The necessity for such constant cleaning would seriously impair commercial production.

The ability to vent fluids such as vaporized liquids and gases is important in this type of insulation board. Such fluids may cause frothing or bubbling of the asphalt when the hot asphalt is applied to the facing. Evaporation of liquid fluids, or expansion of entrapped gases and vapors, may cause asphalt blistering. Therefore, there must be some means present for venting fluids such as vaporized liquids or gases.

In order to vent such fluids it has been the usual practice to provide venting base sheets which may be perforated, grooved or ribbed felts that form lateral escape channels for the fluids. However, it would decrease the cost of materials and labor if such venting sheets could be eliminated and their function provided by the facing sheets themselves.

It is, therefore, one object of the present invention to provide an insulation board which has a plastic foam layer and a facing sheet covering at least one side of the foam layer; the facing sheet forming both a protective layer and a venting means for fluids.

Another object of the present invention is to provide an insulation board of the aforesaid type which is capable of inhibiting frothing and blistering upon application thereto of hot liquids such as hot asphalt and the like.

Another object of the present invention is to provide an insulation board of the aforesaid type which possesses a high degree of dimensional stability.

Another object of the present invention is to provide an insulation board of the aforesaid type which has a flame and fire resistance that is acceptable under industry standards.

Another object of the present invention is to provide an insulation board of the aforesaid type that is relatively inexpensive to produce and easy to install. Other objects and many of the attendant advantages of this invention will be readily appreciated as the same becomes better understood by reference to the following description when read in conjunction with the accompanying drawing wherein:

FIG. 1 is a longitudinal sectional view of an insulated roof construction embodying the present invention, and FIG. 2 is a partly elevational and partly sectional view of one of the butted insulation boards shown in FIG. 1. Referring now in greater detail to the figures of the drawing wherein similar reference characters refer to similar parts, there is shown a roof construction, generally designated 10, which includes a deck 12, here shown as being made of concrete, as asphalt layer 14 above the deck, laterally butted insulation boards, generally designated 16, which are joined at 18, and a roof covering 20. Although not specifically shown, this roof covering is preferably, but not necessarily, a so-called BUR type formed by successive layers of asphalt and roofing felt, usually three to four layers of each.

The insulation boards 16, which are the subject of the present invention, comprise a foam core 22, here shown as being made of polyurethane or polyisocyanate foam, a facer 24 at the top of the foam core and a facer 26 at the bottom of the foam core.

Both of the facers 24 and 26 are of the same construction, and each comprises very fine glass fibers bonded together with polyvinyl acetate; about 90° of the facer being glass.

The size and orientation of the glass fibers in the facer are important factors in the production of the most satisfactory type of product. Generally the diameter of the fibers is in the range of between about 3.75 to 13.0 microns and the length is in the range of about 0.25 to 1.0 inch. Different sizes of fibers can be intermixed if desired. However, the preferable diameter of the fibers is about 6.25 microns, with a length in the above range.

The fibers should be randomly oriented and this random orientation should extend throughout the facer so that the facer has uniform mechanical properties in both length and width. This uniformity of fiber structure of the facers makes the total insulation board dimensionally stable.

The thickness of the facers is an important aspect of the present invention and may vary between about 4 to 120 mils, although the preferable range is between about 7 to 30 mils.

Another significant factor involved in this invention is the treatment of the glass fibers with a non-wicking agent such as a fluorocarbon, silicone or silanes. The non-wicking agent is added after the glass fiber product is formed but while it is still in the wet state. It coats both the glass fibers and the polyvinyl acetate binder. The coating substantially prevent absorption into or absorption on the fibers of any liquids, whereby liquids that enter form beads on the surfaces of the fibers.

In effect, the non-wicking agent is a liquid repellent which permits the facers to shed not only water but hot asphalt and any liquid foam ingredients. However, there is sufficient absorbancy at the mating surface of the foam and facer on the one side and between the hot asphalt and facer on the other side to create a bond. The important thing is that the non-wicking agent prevents total bleeding through of the liquids because the pressure of the liquids is less intense in the interior of the facing sheets than at the interfaces with the other materials.

The above-described facer structure, although capable of repelling liquids, thereby preventing impregnation and bleed-through by either hot asphalt or liquid foam ingredients, is nevertheless porous because of the fiber construction so that it will not trap any vapors. Since it is porous, it permits lateral venting of any vapors from between the foam layer and the roof covering.

Sheets or panels of the above-described construction, which form the facers 24 and 26, are commercially available and, in themselves, do not constitute the present invention except insofar as they are used in the present combination to form the facers for insulation boards of the present type.

Although, this invention has been illustrated in the form of "sandwich" panels or boards wherein the foam layer is covered with a facer on both sides, it may also embrace a board having a facer of this type only on one side. The other side may have another type of facer or none at all, depending on the manner in which it is to be used. Furthermore, although the invention has been described with particular relation to roofing, it is also possible to utilize these boards for other types of insulation.

The invention claimed is:

1. An insulation board comprising a plastic foam layer bonded to at least one facing sheet, said facing sheet comprising glass fibers which are randomly dispersed in uniform fashion throughout the sheet, said fibers being bonded together by a bonding agent, and said fibers and bonding agent being coated by a non-wicking agent to provide a porous but liquid-repellant structure.

2. The insulation board of claim 1 wherein the glass fibers constitute about 90 percent by volume of the facing sheet.

3. The insulation board of claim 1 wherein the facing sheet has a thickness of between about 4 to about 120 mils.

4. The insulation board of claim 1 wherein the facing sheet has a thickness of between about 7 to 30 mils.

5. The insulation board of claim 1 wherein the glass fibers have diameters of between about 3.75 to about 13.0 microns and lengths of between about 0.25 to about 1.0 inch.

6. The insulation board of claim 1 wherein the at least one facing sheet is bonded to each side of said plastic foam.

* * * * *